(12) United States Patent
Sam et al.

(10) Patent No.: US 9,132,874 B2
(45) Date of Patent: Sep. 15, 2015

(54) SUPPORT ELEMENT FOR HUMAN BODY AND METHOD FOR ITS REALISATION

(75) Inventors: Felix Okon Sam, Pozzoleone (IT); Barbara Bigolin, Pozzoleone (IT); Claudio Checchin, Pozzoleone (IT)

(73) Assignee: SELLE ROYAL S.P.A., Pozzoleone (Vicenza) (IT)

(*) Notice: Subject to any disclaimer, the term of this patent is extended or adjusted under 35 U.S.C. 154(b) by 10 days.

(21) Appl. No.: 14/004,606

(22) PCT Filed: Mar. 9, 2012

(86) PCT No.: PCT/IB2012/051128
§ 371 (c)(1),
(2), (4) Date: Nov. 14, 2013

(87) PCT Pub. No.: WO2012/123876
PCT Pub. Date: Sep. 20, 2012

(65) Prior Publication Data
US 2014/0054937 A1 Feb. 27, 2014

(30) Foreign Application Priority Data
Mar. 11, 2011 (IT) .............................. VR2011A0052

(51) Int. Cl.
| | |
|---|---|
| *B62J 1/00* | (2006.01) |
| *B62J 1/18* | (2006.01) |
| *B62J 1/22* | (2006.01) |
| *B62J 1/26* | (2006.01) |
| *B62K 21/26* | (2006.01) |
| *B29C 45/14* | (2006.01) |
| *B29D 99/00* | (2010.01) |
| *B29C 44/12* | (2006.01) |

(Continued)

(52) U.S. Cl.
CPC ............... *B62J 1/26* (2013.01); *B29C 44/1233* (2013.01); *B29C 44/1285* (2013.01); *B29C 44/145* (2013.01); *B29C 45/14418* (2013.01); *B29D 99/0092* (2013.01); *B62J 1/22* (2013.01); *B62K 21/26* (2013.01); *B29C 45/14467* (2013.01); *B29K 2075/00* (2013.01); *B29L 2031/3094* (2013.01)

(58) Field of Classification Search
CPC ................. B62J 1/00; B62J 1/007; B62J 1/26
USPC .......................................... 297/201, 202, 214
See application file for complete search history.

(56) References Cited

U.S. PATENT DOCUMENTS 3,863,277 A  2/1975 Harrison
4,218,090 A * 8/1980 Hoffacker et al. ............ 297/214

(Continued)

FOREIGN PATENT DOCUMENTS

EP 0903321 3/1999
EP 1382520 1/2004

(Continued)

*Primary Examiner* — Rodney B White
(74) *Attorney, Agent, or Firm* — Tutunjian & Bitetto, P.C.

(57) ABSTRACT

A support element (e.g., a seat, a saddle or a handgrip) for the human body including a layer made from soft and yieldable material and at least one surface insert with different characteristics in terms of appearance and/or comfort, in which said surface insert includes a visible surface to be in contact with the user, wherein said visible surface has a smaller size than said layer and wherein said surface insert includes at least one portion embedded in said layer. A process for making the support element is also presented.

14 Claims, 4 Drawing Sheets

(51) Int. Cl.
*B29C 44/14* (2006.01)
*B29L 31/30* (2006.01)
*B29K 75/00* (2006.01)

(56) References Cited

U.S. PATENT DOCUMENTS

| | | | | |
|---|---|---|---|---|
| 5,348,369 | A | * | 9/1994 | Yu ................................ 297/214 |
| 5,714,108 | A | * | 2/1998 | Girardi et al. ............. 297/214 X |
| 5,720,518 | A | * | 2/1998 | Harrison ....................... 297/214 |
| 5,823,618 | A | * | 10/1998 | Fox et al. ...................... 297/201 |
| 5,911,475 | A | * | 6/1999 | Nakahara ................... 297/202 X |
| 6,019,423 | A | * | 2/2000 | Dodge et al. .............. 297/214 X |
| 6,059,359 | A | | 5/2000 | Cassani |
| 6,095,601 | A | * | 8/2000 | Yu ............................. 297/202 X |
| 6,131,994 | A | * | 10/2000 | Yates ............................ 297/214 |
| 8,091,963 | B2 | * | 1/2012 | Wyner et al. ................. 297/214 |
| 8,128,164 | B2 | * | 3/2012 | Segato ....................... 297/202 X |
| 8,297,696 | B2 | * | 10/2012 | Chuang ..................... 297/202 X |
| 2005/0104423 | A1 | * | 5/2005 | Yu ................................ 297/214 |
| 2005/0212337 | A1 | * | 9/2005 | Lee ............................... 297/214 |
| 2006/0076808 | A1 | * | 4/2006 | Buchel .......................... 297/214 |
| 2007/0176472 | A1 | * | 8/2007 | Chuang ........................ 297/202 |
| 2007/0273184 | A1 | * | 11/2007 | Garneau ................... 297/202 X |
| 2008/0001445 | A1 | * | 1/2008 | Lee ............................... 297/201 |
| 2008/0179925 | A1 | * | 7/2008 | Chuang ........................ 297/214 |
| 2009/0108644 | A1 | * | 4/2009 | Yu ................................ 297/214 |
| 2010/0045084 | A1 | * | 2/2010 | Segato ....................... 297/195.1 |
| 2014/0070576 | A1 | * | 3/2014 | Wu et al. ...................... 297/214 |

FOREIGN PATENT DOCUMENTS

| | | |
|---|---|---|
| GB | 1303852 | 1/1973 |
| GB | 2433719 | 7/2007 |
| IT | 1207441 | 5/1989 |

* cited by examiner

SUPPORT ELEMENT FOR HUMAN BODY AND METHOD FOR ITS REALISATION

TECHNICAL FIELD OF THE INVENTION

The present invention concerns a support element for the human body.

More in particular, the present invention concerns a support element such as for example a saddle for means of transport like cycles or motorcycles, a seat, a grip, a handle for the handlebar of cycles, motorcycles, sport equipment and the like, an armrest, a back support, a headrest, sport and leisure equipment, and the like.

DESCRIPTION OF RELATED ART

In some manufacturing sectors, such as those for manufacturing means of transport like cycles, motorcycles and the like, or also in other fields, like for example the fields of manufacturing various kinds of devices, or furniture elements, or sport and leisure equipment, human body support elements are used, of course for the most wide ranging purposes.

For example, in the field of manufacturing cycles and motorcycles, such support elements can consist of saddles, or handles for resting the hands, and the like.

In other fields, such as for example the fields of manufacturing devices of various kind with human actuation or sport equipment, for example rowing machines, weight benches, etcetera, such support elements can consist of seats, back supports, headrests, arm rests, grips, or the like, which allow man to interact with machine in a comfortable manner, for example sitting down, resting his hands, arms or head, actuating the machine controls, etc.

Such support elements generally comprise—think for example of a saddle or a handle—a rigid core, partially or completely covered with a layer of soft and yieldable material such as a polyurethane foam, an elastomeric material or the like.

The soft and yieldable layer of material can also in turn be partially covered by a further cover for example made from leather, or from other natural or synthetic material with suitable characteristics in terms of appearance or function, obviously variable in relation to the specific type of application.

It is known that in some specific applications it is necessary to have support elements having, on the surface, one or more portions—in number, shape and function that of course vary in relation to their application—with different appearance with respect to the rest of the surface of the support element.

These portions with different appearance can be, for example, inserted in the support element with the purpose of improving the visibility of the element itself—for example by using different looks or colourings—so as to allow the user to instantaneously identify the support surfaces in the device with which he must interact, or which he must manage or manipulate.

In other applications, such portions with different appearance can have the purpose of improving the visibility of logos, drawings, or other types of information, messages or more.

For example, Italian patent n. 1207441 to the same Applicant describes a process for making a saddle, in which the felt, the padding and the covering of the saddle itself are assembled in a single machining step, exploiting the adhesion characteristics that the polyurethane of the padding exerts, during its foaming reaction, both on the felt and on the covering material, thus obtaining a perfect joining of the three components.

In European patent n. EP 0903321, to the same Applicant, a support structure is described with ornamental elements, comprising a filler made from an elastically yieldable material, comprising at least one layer of transparent polyurethane gel and a layer of elastomeric foamed material, and covered by a covering layer made from flexible sheeted material, in which said filler comprises, inside it and between the two layers, at least one ornamental element. The covering layer has at least one area that is optically transparent through which the ornamental element itself is visible.

The production steps of this support structure, however, are very laborious and require further treatments in order to make the gel transparent, a subsequent arrangement of the ornamental element over the layer of partially polymerised gel and a further subsequent laying the elastomeric material layer, which must in turn polymerise and expand.

At the current state of the art, in some applications the portions having different appearance are directly connected to the surface of the support element, in areas that are suitably arranged.

In other applications, such portions with different appearance are obtained through tampography, or pad printing, directly on the surface of the support element, on the desired areas.

These known techniques do not ensure products having optimal resistance over time to be obtained, since they tend, for example, to deteriorate, separate, get scratched, crumble, by action of the repeated contact with the parts of the human body involved or by action of weather conditions, or for yet other reasons.

SUMMARY OF THE INVENTION

The technical task of the present invention is therefore that of improving the state of the art, by devising a support element for the human body with portions having different appearance without the drawbacks mentioned above.

In such a technical task, one purpose of the present invention is to devise a support element for the human body that is equipped with portions having different mechanical and functional properties with respect to the remaining part of the support element.

A further purpose of the present invention is to devise a process for making a support element for the human body that is equipped with portions that are more wear resistant and resistant to weather conditions, and against other actions that are potentially dangerous for the integrity of the resting surface thereof.

Another purpose of the present invention is to devise a process for making a support element for the human body, that is equipped with portions with properties in terms of appearance and functions that are improved with respect to the rest of the support element, that can be actuated with an optimisation of the production costs, a greater efficiency of the process and with the use of materials which can reduce impact on the environment.

Such a technical task and such purposes are achieved with the support element for the human body according to the present principles, and with the process for making such a support element according to the present principles.

The support element according to the invention has portions with different appearance consisting of surface elements having high surface quality, which are capable of offering a different approach in terms of appearance and a localised functionality that is differentiated thanks to an integrated process that joins materials having high compatibility which can reduce the impact on the environment, ensuring, at the same time, a greater duration of use and a greater resistance to weather conditions and the like, without becoming damaged.

Moreover, such surface elements constitute areas having different characteristics in terms of comfort of resting of the user, for example preferably areas with greater yield, softness, or even with high grip.

The support element is moreover made in a single moulding step, which can be actuated with equipment and technology that is known and available in the field.

Further advantageous characteristics are described in the dependent claims.

BRIEF DESCRIPTION OF THE DRAWINGS

The characteristics of the invention shall become clearer to any man skilled in the art from the following description and from the attached drawing tables, given as a non limiting example, in which.

DETAILED DESCRIPTION OF PREFERRED EMBODIMENTS

Figure 1:
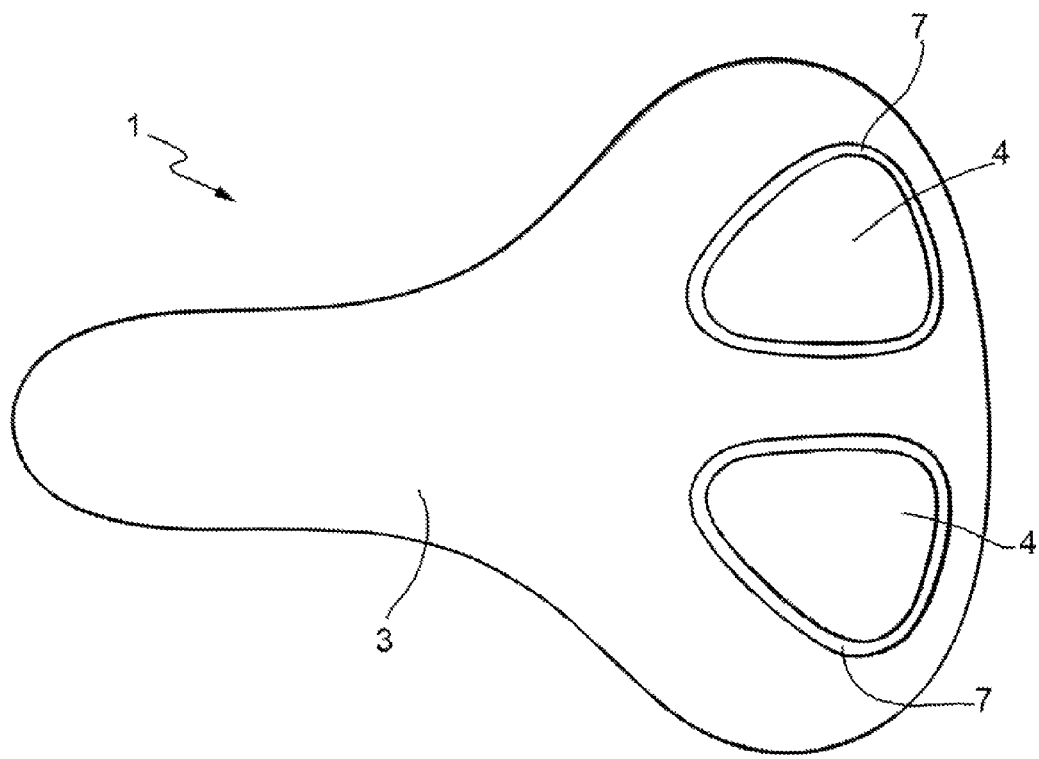
FIG. 1 is a plan view of a support element according to the invention, consisting of a saddle.

With reference to the attached FIG. 1, a support element for the human body according to the present invention is wholly indicated with reference numeral 1.

The support element 1 comprises a surface that is suitable for coming into contact with the user.

In FIG. 1, the support element consists of a saddle for cycles, motorcycles and the like.

It should however be noted that the support element according to the invention can consist of any other element in which at least one part of the human body rests or adheres, for example in the field of means of transport, various kinds of devices, sport equipment and the like, without any limitation.

Figure 3:
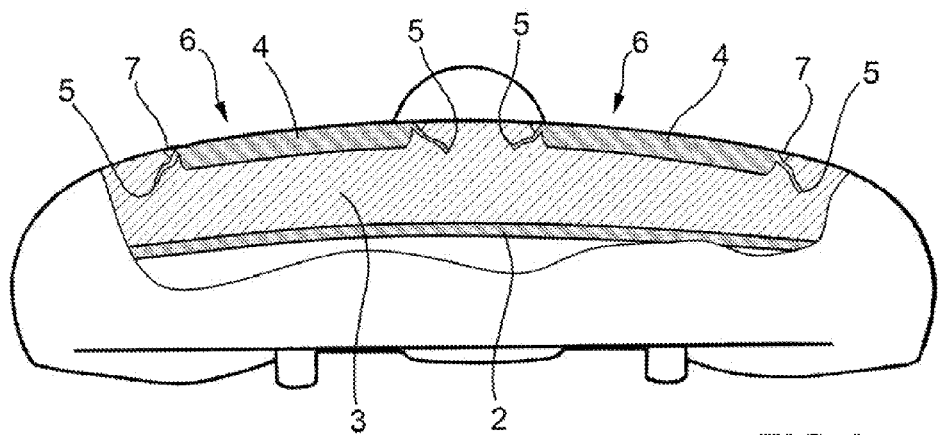
FIG. 3 is a partially sectioned rear view of the support element of FIGS. 1, 2.

As illustrated in the partially sectioned view of FIG. 3, the support element 1, consisting of a saddle, comprises, in a known manner, a core 2, known in the field also with the name felt, made for example from metal, plastic or from any other material with suitable characteristics. In this version of the invention, the core 2 is rigid, but it could also be semi-rigid or elastic.

The core 2 of the saddle 1 has shapes and sizes that are conventional and known in the field.

The core 2 comprises means for coupling to means of transport, machinery, known devices (not illustrated), sport equipment, furniture elements, and the like, or to any other means or device in which the support element according to the invention is foreseen.

In the present embodiment, the core 2 comprises in particular coupling means, that are not represented in the figures and that are of the type known in the field, with the seatpost of the saddle of cycles, motorcycles and the like.

At least one portion of the core 2 is covered with one layer 3 of soft and yieldable material.

In the present embodiment, the entire upper surface of the core 2 is covered with the layer 3 made from soft and yieldable material.

In other embodiments, only one or more portions of the core 2 can be covered with one layer 3 of soft and yieldable material.

The soft and yieldable material with which the layer 3 is made consists of a polyurethane foam, of an elastomeric material, of similar material or of combinations thereof.

For example, the polyurethane foam can be of the self-skinning type, i.e. it is capable of forming an outer surface having characteristics that are optimal in terms of the surface quality and of the resistance to wearing.

The layer 3 made from soft and yieldable material can also be covered by a possible further protective surface film that is applied through spraying, painting, or through another technique that is suitable for the purpose.

The layer 3 made from soft and yieldable material comprises at least one surface insert 4 having different characteristics in terms of appearance and/or comfort with respect to the rest of the surface of the support element 1 or of the layer 3.

The at least one insert 4 comprises a visible surface 6 that is in contact with the user.

The layer 3 made from soft and yieldable material comprises an outer surface that substantially corresponds to the surface of the support element 1 that is suitable for coming into contact with the user.

The surface of the support element 1 that is suitable for coming into contact with the user is made up of the visible surface 6 of the at least one surface insert 4 and of the outer surface of the layer 3.

The layer 3 surrounds the at least one surface insert 4. As shall become clearer from the rest of the description, the support element 1 comprising at least one surface insert 4 is made in a single moulding step.

More in detail, in the present embodiment of the support element 1, made up of a saddle, the layer 3 comprises at least one surface insert 4.

In particular, the outer surface of the layer 3 is interrupted by the presence of the at least one surface insert 4.

The surface insert 4 is arranged at the surface of the support element 1 suitable for coming into contact with the user.

Each surface insert 4 can have a different colour from that of the layer 3, or it can have a different surface finishing, or it can have other characteristics, which concern its outer appearance, which differentiate it with respect to the rest of the surface of the support element 1.

In one version of the invention, such other characteristics can consist of logos, indications, graphical elements, prints, screen printing, pad printing, transfers, combinations thereof and all other graphical and ornamental elements which can be useful to differentiate the support element 1 or to make it more appealing or visible. Such characteristics cannot be directly made in the layer 3 of the support element 1. Such characteristics can be directly contained in the surface insert 4 or they can be conveyed by it in various ways.

In some cases, the visible surface 6 of the surface insert 4 can have high grip, for a better handling.

Each surface insert 4 also has a shape such as to ensure optimal and comfortable resting of the involved part of the body, for example a suitably studied ergonomic shape or a surface finishing with characteristics that are different from those of the rest of the support element 1, as shall become clearer from the present description.

Each surface insert 4 can be made from a polyurethane foam and/or from an elastomeric material and the like or it can also be made from a different material with respect to that from which the layer 3 is made, for example leather, fabric, synthetic material, metal, rubber, three-dimensional material of a different kind, self-modelling material, transpiring material, material with low friction coefficient, etcetera, combinations thereof or of other material suitable for conferring different appearance and/or comfort characteristics to the surface insert 4.

More in particular, each surface insert 4 can be made from a different material having characteristics that are different in terms of comfort when resting the part of body involved and in terms of appearance, with respect to the layer 3 or to the remaining surface of the support element 1.

In particular, thanks to the at least one surface insert 4, it is possible to vary material in each area, for example so as to differentiate the prostate area or other areas of the body of the user that are particularly sensitive, so as to confer different mechanical, functional, appearance, comfort, etcetera properties to the support element 1.

For example, in one embodiment, each surface insert 4 can be made from a soft material.

In another version of the invention, the surface insert 4 can be made from a material having a thinner thickness with respect to the leather formed by the self-skinning polyurethane foam of the layer 3, conferring in such a way a greater sensation of comfort.

In a further version of the invention, the surface insert 4 is made from metal material or another material that is resistant to scratching and impact, and arranged, for example, in the side portions of the support element 1, which can be subject to impact or scratching or through which the support element 1 can rest against a wall or against another resting surface. In such a way, the surface insert 4 confers a greater life span and integrity to the support element 1. In the case in which a metal material is used, the surface insert 4 is made from a thin metal sheet, which has flexible characteristics that are suitable for responding to the manufacturing requirements necessary for making the present invention, as described in the present description. It should be clear that, in the case in which metal and/or rigid materials are used, the edges thereof shall be rounded so as to not hurt or be an annoyance to the user.

The metal or resistant material or any other material forming the surface insert 4 can be previously overinjected with a polyurethane or elastomeric material.

In yet another version of the invention, the surface insert 4 is made from a particularly flat material or a material with low friction, and is arranged for example in the side portions of the support element 1, at the rubbing areas of the leg or of the body of the user during, for example, pedalling. In such a way, the surface insert 4 determines an area with lower friction coefficient, capable of not annoying or wasting energy of the user.

In one version of the invention, the surface insert 4 is made from a transpiring material or a material that in any case limits sweating of the part of body of the user with which it comes into contact, improving his sensation of comfort.

The surface insert 4, therefore, can be arranged at the prostatic area and/or at the ischiatic area, and/or at side portions of the support element 1, in which it is necessary to have greater wear resistance, or at the areas undergoing rubbing of the leg of the user, where it is necessary to have less friction, and/or in other positions that are suitable for conferring greater comfort and functionality or a different appearance with respect to the rest of the support element 1. In other embodiments, each surface insert 4, for example, can be made up of a plurality of elements that are arranged over one another or coupled in another manner, made from different materials with different characteristics in terms of resting comfort. For example, a coupling of yieldable materials can be obtained with other more rigid ones, or yet other combinations, arranged in different ways in relation to the specific requirements.

In one version of the invention, the surface insert 4 can comprise an outer shell, sealed, in soft material, inside which is arranged at least one of: a self-modelling material, a natural element, cork, silica, a similar material, a synthetic element, micro-beads, grain materials of any origin, polystyrene, or similar material, a viscoelastic material, a gel, a liquid gel, or combinations thereof.

The outer shell can be made from polyethylene or from any material suitable for the purpose.

In such a way, the surface insert 4, thanks to the self-modelling material contained in the outer shell, is able to distribute the pressure exerted by the body of the user, while simultaneously conferring a greater sensation of comfort to the latter.

In one version of the invention, the surface insert 4 can comprise a polyurethane gel or an elastomeric material.

Each surface insert 4 can be made, for example, through thermoforming methods.

In one version of the invention, each surface insert 4 is provided with a portion 5 that is enclosed in the layer 3 of soft and yieldable material. The portion 5 enclosed in the layer 3 is made up of at least one side flap.

In one version of the invention, the portion 5 is peripheral.

More in detail, the side flap 5 is foreseen along the entire perimeter of the surface insert 4, in particular of its visible surface 6, as explained in greater detail in the rest of the description.

Moreover, the side flap 5 projects from the visible surface 6 of the surface insert 4.

The side flap 5 can be made with quite a thin thickness, for example of some tens of millimeters.

As visible, for example, in FIG. 3, the peripheral side flap 5 that projects from the visible surface 6 makes it possible to achieve a coupling between the layer 3 and the surface insert 4 which prevents any possible relative movement between the two parts.

Such a coupling, as previously mentioned, is made in a single moulding step.

Through such a coupling, the surface insert 4 is thus fixedly held and locked within the layer 3 of soft and yieldable material and cannot become detached from it.

Figure 9:
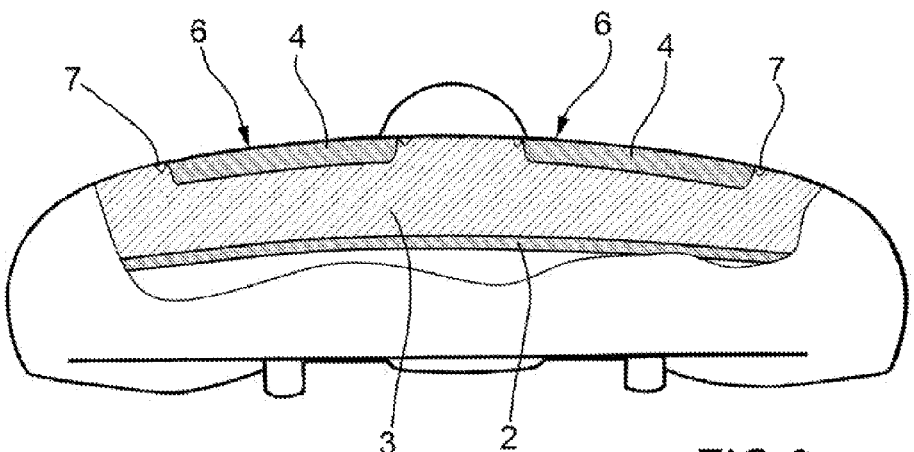
FIG. 9 is a partially sectioned rear view of a further version of the support element of FIGS. 1, 2.
Figure 10:
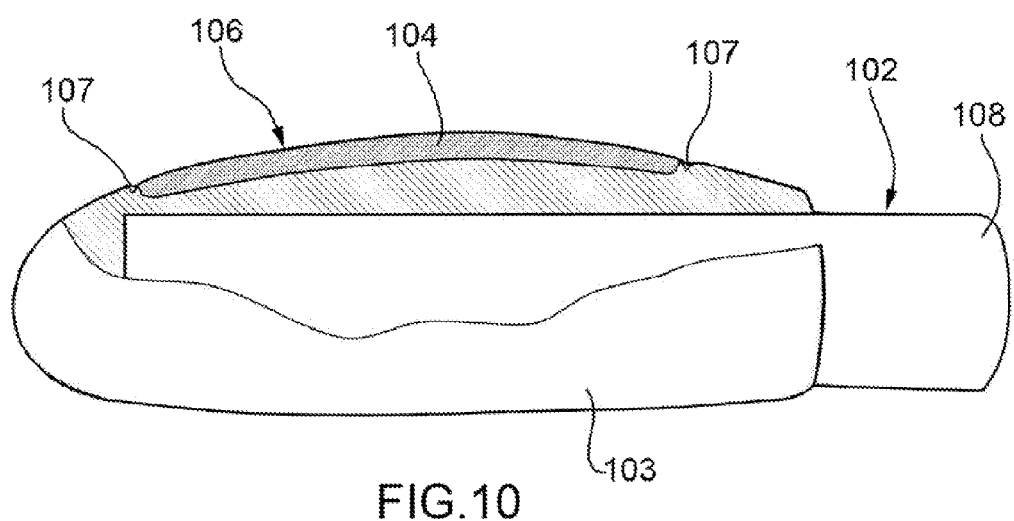
FIG. 10 is a partially sectioned side view of a further version of the support element of FIGS. 4, 5.

In a further version of the invention, represented in FIGS. 9 and 10, each surface insert 4 does not have a portion 5, such as for example a side flap, enclosed in the layer 3 of soft and yieldable material. In this version of the invention, the surface insert 4 adheres to the layer 3 of soft and yieldable material through a compatibility interface between the materials that form the surface insert 4 and the layer 3, respectively. Such an adhesion, therefore, is made thanks to the interaction existing between the materials that form the surface insert 4 and the layer 3, which are compatible with one another and therefore adhesive to one another.

As a non limiting example, in the case in which there is a layer 3 made from polyurethane foam, the surface insert 4, in order to be compatible and therefore adhere to the layer 3, can be made from a polyurethane material, such as, for example, a film or layer of thermoplastic material, or from any material that is pre-emptively treated with a compatibilising material, such as for example a primer suitable for the purpose.

On the other hand, in the case in which there is a layer 3 made from elastomeric material, the surface insert 4, in order to be compatible and therefore adhere to the layer 3, can be made from a polyurethane based material, such as for example a film or layer of thermoplastic polyurethane material or a material impregnated with polyurethane, or from any material that has been pre-emptively treated with a compatibilising material, such as for example a primer suitable for the purpose.

In such a way, the contact surface between the surface insert 4 and the layer 3 makes a compatibility and adhesion interface between them.

In such a way, a coupling between such materials is created thanks to which the surface insert 4 is fixedly held and locked within the layer 3 of soft and yieldable material with the impossibility of detaching from the latter.

At the joining area of the outer surface of the layer 3 and the visible surface 6 of each surface insert 4 there can be a peripheral throat 7 with a small section, for reasons that shall become clearer in the rest of the description. The invention thus conceived makes it possible to achieve important technical advantages.

Firstly, according to the invention it is possible to make, in a single moulding step, elements for supporting the human body comprising, at the surface in contact with the user, surface elements having different characteristics in terms of appearance that ensure optimal resistance and duration in the use, to weather conditions, and the like.

Moreover, the invention makes it possible to obtain, in a single moulding step, elements for supporting the human body comprising, at the surface in contact with the user, surface areas that are differentiated in terms of their function and/or of the resting comfort, so as to foresee, for example, areas with characteristics of greater yielding or softness at the regions in which there is a higher specific pressure of the body on the support element itself.

Having a single moulding step results in obvious advantages in terms of cost and production time and also leads to a greater compatibility between the materials.

Moreover, such a step can be obtained with equipment that is essentially known and conventional, already available to men skilled in the art.

Figure 4:
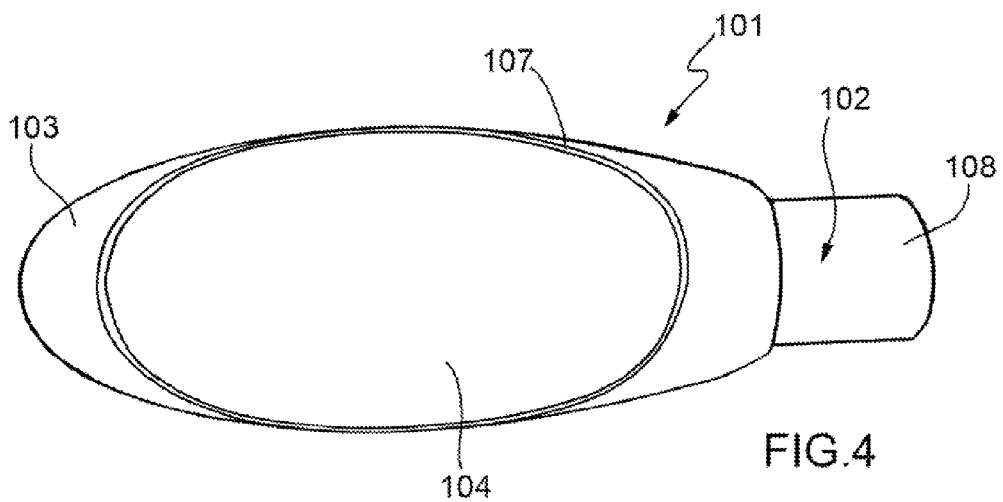
FIG. 4 is a plan view of another embodiment of the support element according to the invention, consisting of a handle.
Figure 5:
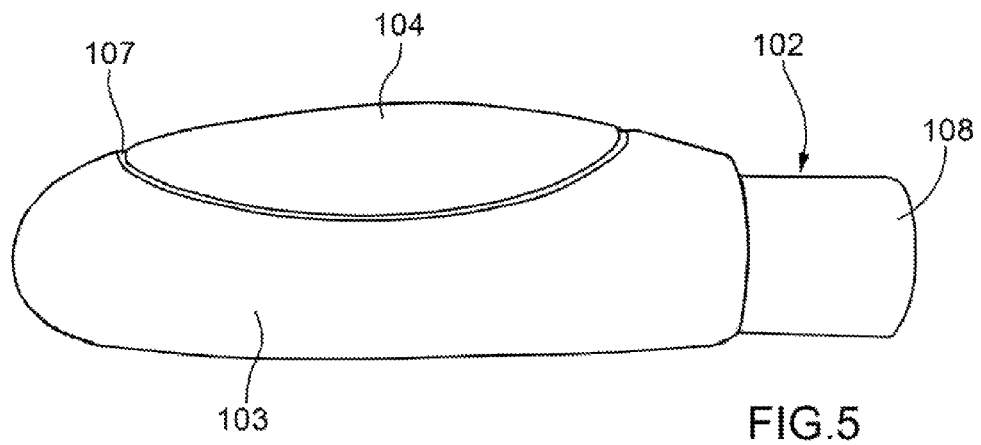
FIG. 5 is a side view of the support element of FIG. 4.
Figure 6:
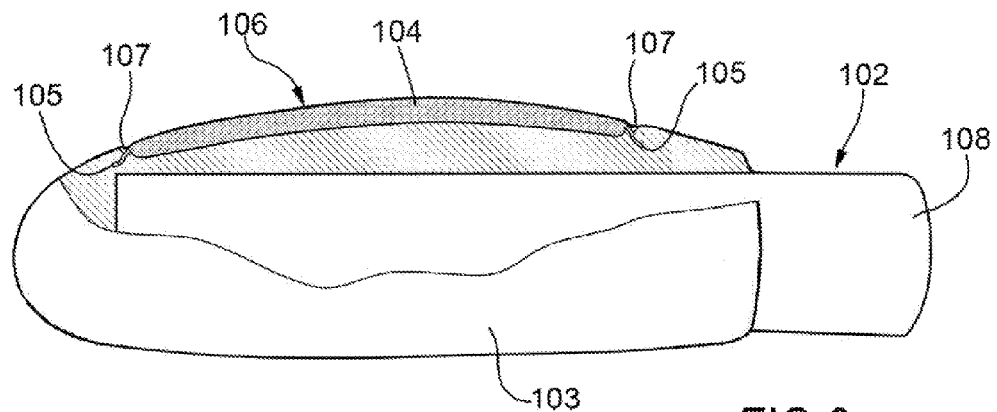
FIG. 6 is a partially sectioned side view of the support element of FIGS. 4, 5.

Another embodiment of the support element according to the invention is illustrated in FIGS. 4, 5, 6.

In this embodiment we have used, to indicate same parts, the same reference numerals as the previous embodiment, increased by 100.

In this embodiment, the support element is made up of a handle 101 for the handlebar of means of transport such as cycles, motorcycles and the like and/or sport equipment.

The handle 101 comprises a core 102. Such a core 102 can be rigid or semi-rigid or elastic.

The core 102 is made, for example, from plastic material, metal material, or from any other material with characteristics that are suitable for this type of application.

In a non-limiting embodiment, the core 102 is in the form of a tube. Such a core 102 can be in the form of a sleeve.

In a further non limiting embodiment the core 102 is made, for example, through a covering layer, possibly soft, or made through a spray paint of any material suitable for the purpose.

The core 102 defines an area of rigidity that is differentiated with respect to the remaining portion of the support element 101.

The core 102 is suitable for being coupled, for example, to a handlebar of a bicycle and/or of sport equipment, with the aid of locking means that are known in the field and that are not object of the present invention.

The core 102 is covered, for at least one portion of the outer surface with a layer 103 of soft and yieldable material, the characteristics of which have been illustrated in the description of the previous embodiment.

In this embodiment, the core 102 is completely covered by the layer 103 except for, possibly, an end section 108, which can be functional to the locking onto the handlebar through locking rings or other known means.

Consequently the layer 103 also has a substantially tubular shape, for example slightly convex, closed at a base, like in the case of the present embodiment.

The handle 101 also comprises a surface insert 104, with different characteristics in terms of appearance and/or of comfort with respect to the remaining part of the covering layer 103.

The surface insert 104 can have an oval shape, as illustrated, or different shapes, without for this reason departing from the scope of protection of the present invention.

The surface insert 104 can be foreseen in the resting area of the palm of a hand or it can be foreseen in different areas in contact with the user, without for this reason departing from the scope of protection of the present invention.

Moreover, it could be foreseen for there to be many surface inserts 104 on a same handle.

The specific characteristics of the surface insert 104 of the handle 101, both in terms of the appearance and in terms of the functionality and of the resting comfort, and in terms of production technology, are the same described in relation to the previous embodiment, with the already described technical effects and advantages.

Figure 7:
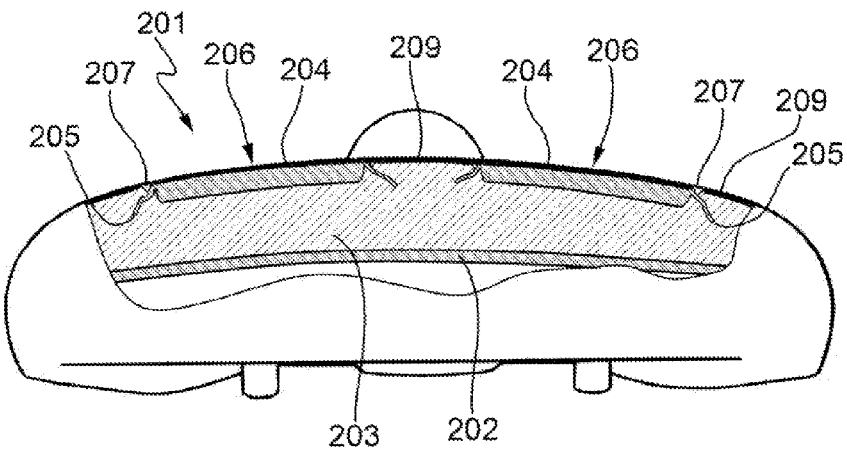
FIG. 7 is a partially sectioned rear view of another embodiment of the support element according to the invention.

Yet another embodiment of the support element according to the present invention is represented, in a partial section, in FIG. 7.

In this embodiment, the same reference numerals as in the previous embodiment have been used to indicate same parts, increased by 100.

Figure 2:
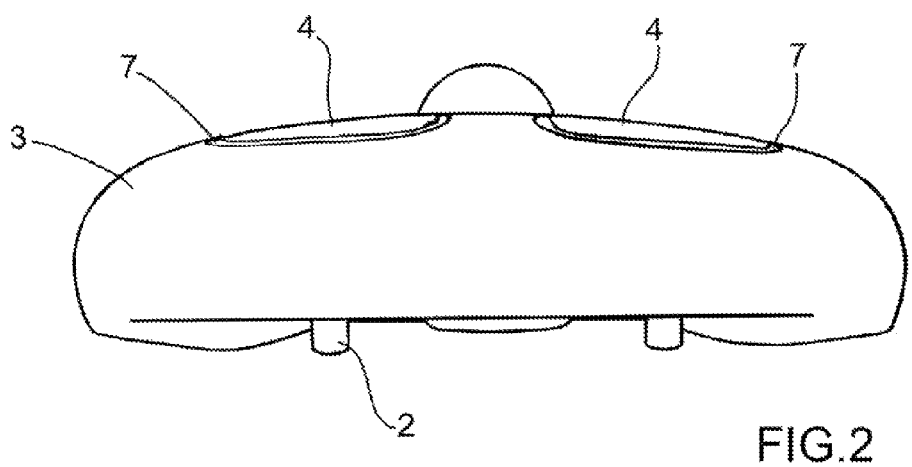
FIG. 2 is a rear view of the support element of FIG. 1.

This embodiment is the same as that of FIGS. 1-3, i.e. the support element 201 is, as an example, made up of a saddle. The support element 201 comprises an outer cover 209. The outer cover 209 is substantially positioned at at least one of the surface inserts 204 and/or, possibly, near to them. In this embodiment, the support element 201 has surface characteristics that can be personalised more with respect, for example, to the embodiment of FIGS. 1-3, since the at least one surface insert 204 and, possibly, at least one part of the layer 203 made from soft and yieldable material arranged near to the at least one surface insert 204, are covered with the most suitable material for the specific application.

For example, the outer cover 209 can be made from leather, natural or synthetic fabric, or the like. The outer cover 209 can be made from transparent material.

In the rest of the description we shall describe, in its main steps, a process for making a support element for the human body according to one version of the present invention. The process steps are applied in an absolutely general manner, i.e. irrespective of the specific type of support element made, which in the specific case consists, for example, of a handle.

The process initially comprises a step of providing at least one surface insert 104.

The surface insert 104 can be made, as previously mentioned, for example through thermoforming.

Once the surface insert 104 has been inserted in a suitable number in relation to the specific application, the process comprises a step of arranging such a surface insert 104 inside a first half-shell S of a mould.

The mould is of the type typically known in the field. The visible surface 106 of the surface insert 104 is in direct contact with the inner surface of the first half-shell S of the mould.

The surface insert 104 is housed at a protruding ribbing N that is foreseen in the inner surface of the first half-shell S of the mould.

The perimeter of such a ribbing N substantially corresponds to that of the visible surface 106 of the surface insert 104.

In such a way, in the insertion of the surface insert 104, the side flap 105 is slightly folded towards the inside of the mould with effects that shall be described in more detail in the rest of the description.

At this stage, the process foresees a step of placing the visible surface 106 of the surface insert 104 in communication with a vacuum source.

This is obtained thanks to the presence of holes F in the first half-shell S, which are placed in communication with a vacuum source of the type known in the field, not further described and not represented in the figures.

In such a way the optimal adhesion of the visible surface 106 of the surface insert 104 to the inner surface of the first half-shell S is obtained, without the risk of accidental movements or displacements.

The possibility of putting only the inner surface of the mould in communication with a vacuum source at the visible surface 106 of the at least one surface insert 104, with respect to the prior art in which the entire inner surface of the mould is put in communication with such sources, confers the technical advantage of positioning elements in a localised manner. In such a way, the element that must be held in vacuum does not necessarily correspond to the entire inner surface of the mould, but it can be limited only to some portions thereof, obtaining therefore a specific localisation of such at least one element.

Subsequently, the mould is closed with a second half-shell, not represented in the figures.

Then there is a step of injecting, inside the mould, a material of the polyurethane foam type and/or an elastomeric material or the like, thus obtaining the layer 103 of soft and yieldable material.

Subsequently, the mould is closed with a male of the same mould, which is not represented in the figures.

The injection modalities of such a material inside the mould are known in the field and are not further described.

Figure 8:
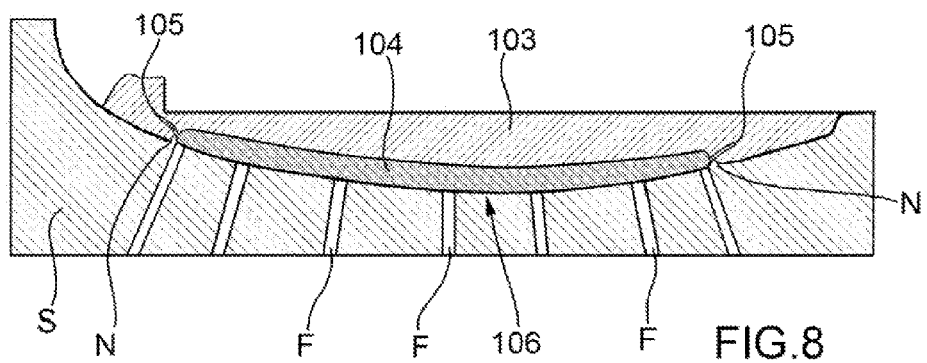
FIG. 8 is a partially sectioned side view of a step of a version of the process for making the support element according to the invention.

This step is schematically represented in FIG. 8, in which the support element obtained consists of a handle like that of FIGS. 4-6.

As visible in FIG. 8, the injection of material achieves an optimal coupling with the surface insert 104, so that the material injected is arranged exclusively around its inner surfaces and around the side flap 105, but not between the insert itself and the surface of the first half-shell S of the mould.

The penetration of material in this area is indeed prevented by the presence of the portion or of the side flap 105 folded at the ribbing N. The pressure of the material on the flap 105 indeed carries out a perfect seal closure that prevents any leakage. The injected material of the layer 103, therefore, presses and hermetically closes the portion or the side flap 105 against the ribbing N.

The ribbing N folds the portion or side flap 105. The folding occurs towards the area in which the material of the layer 103 will be injected.

The ribbing N creates a sort of dike for the material of the layer 103 injected which is arranged exclusively around the inner surfaces of the surface insert 104 and around the portion or the side flap 105, but not between the surface insert 4 itself and the surface of the first half-shell S of the mould.

Moreover, the arrangement of the material of the layer 103 around the side flap 105 determines an optimal locking of the surface insert 104 within the foam.

There is a step in which the material injected inside the mould polymerises, in the case of a polyurethane foam, or it reacts, in the case of an elastomeric material, cross-linking or hardening and compacting; then the male and the half-shells are opened and the final product is obtained.

As it can be understood, the peripheral throat 107 between the surface of the layer 103 and the visible surface 106 of the surface insert 104 is indeed determined by the presence of the ribbing N in the first half-shell of the mould.

Figure 11:
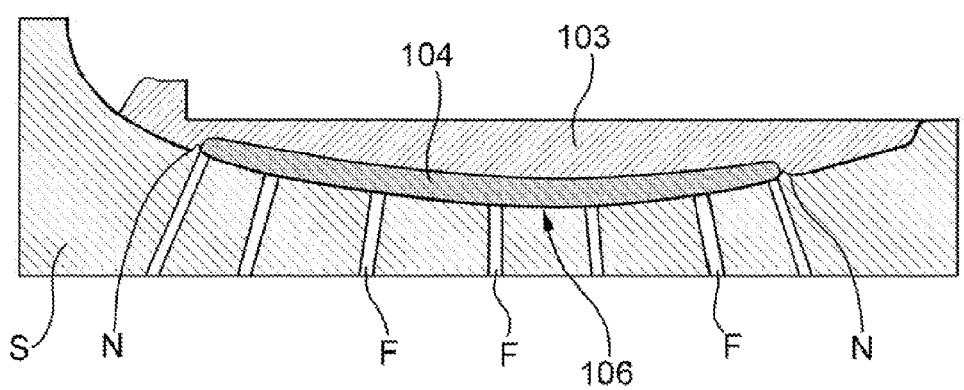
FIG. 11 is a partially sectioned side view of a step of a further version of the process for making the support element according to the invention.

In a further version of the invention, schematically illustrated in FIG. 11, in which there is no portion 105, such as for example a side flap, enclosed in the layer 103 of soft and yieldable material, the process for making a support element for the human body foresees the aforementioned steps. However, differently from what has been described above, in this version of the invention the surface insert 104 adheres to the layer 103 made from soft and yieldable material thanks to the compatibility of the materials which respectively form the surface insert 104 and the layer 103, and not because, as described previously, the side flap 105 is slightly folded inwards with respect to the mould and enclosed in the injected material.

In this version of the invention, the coupling created by the adhesion between the materials and the layer 103 and the surface insert 104, obtained thanks to the presence of a compatibility and adhesion interface, as previously described, defines an optimal locking of the surface insert 104 within the layer 103, with the impossibility of detaching from the latter.

The penetration of injected material in the area corresponding to the surface insert 104 is prevented by the presence of the ribbing N, when it is present.

In another embodiment of the process, it can also be foreseen for there to be a step of arranging an outer cover 209 inside the first half-shell S of the mould, in direct contact with its inner surface substantially at the at least one surface insert 204 and before the injection step of the material which will form the layer 3, at one or more ribbings N foreseen in the mould.

It has thus been seen how the invention achieves the proposed purposes.

The present invention has been described according to preferred embodiments but equivalent variants can be conceived without departing from the protection offered by the following claims.

The invention claimed is:

1. A support element for the human body, comprising a layer of soft and yielding material and a core of rigid, semi-rigid or elastic material at least partially coated with said layer and comprising means for coupling with means of transport, furnishing elements, and sports equipment, said support element further comprising at least one surface insert having different characteristics in terms of appearance and/or comfort, wherein said at least one surface insert comprises a visible surface in contact with the user, wherein said visible surface has a smaller size than said layer and that said surface insert comprises at least one portion embedded in said layer, said at least one portion consisting of at least one side flap of a reduced thickness extending from the visible surface of said surface insert, in that said layer is moulded around inner surfaces of said surface insert and completely around said side flap of said surface insert, in that said support element is a saddle for a bicycle or for a motorcycle or for a transport means, a seat, a handgrip for the handlebars of bicycles, motorcycles, and sports equipment, and in that said support element is provided with a surface suitable to come in contact with a user and comprising said visible surface.

2. The support element according to claim 1, wherein said surface insert comprises a polyurethane foam, an elastomeric material, leather, fabric, synthetic materials, metal, rubber, different kinds of three-dimensional materials, a self-modelling material, a breathable material, a low friction coefficient material or combinations thereof.

3. The support element according to claim 2, wherein said polyurethane foam of said layer is of the self-skinning type.

4. The support element according to claim 1, wherein said surface insert comprises a plurality of inserts that are stacked or coupled, made from materials with different comfort characteristics when resting on them.

5. The support element according to claim 1, wherein said surface insert comprises an outer casing, inside which a self-modelling kind material is positioned, a natural element, cork, silica, a synthetic element, microspheres, a granular material, polystyrene, a visco-elastic material, a gel, a liquid gel or combinations thereof.

6. The support element according to claim 1, wherein said surface insert is made by thermoforming.

7. The support element according to claim 1, wherein said surface insert comprises a gel or an elastomeric material.

8. The support element according to claim 1, wherein said surface insert is of different colour from that of said layer, it comprises a different surface finish, it comprises or conveys characteristics, concerning its outer appearance, which differentiate it with respect to the remaining surface of said support element, logos, marks, graphical elements, prints, serigraphy, pad prints, transfers, other graphical or ornamental elements that may be used to differentiate said support element or make it look nicer or stand out more, or combinations thereof.

9. The support element according to claim 1, wherein said side flap is foreseen over the entire perimeter of said surface insert.

10. The support element according to claim 1, wherein said surface insert comprises a material compatible with the material from which said layer is made, suitable for sticking to the latter.

11. The support element according to claim 10, wherein said compatible material of said surface insert comprises a polyurethane material, a film or layer of thermoplastic material, or any material pre-emptively treated with a compatibilizer material, a primer suitable for the purpose, so as to stick to said layer, made from polyurethane foam.

12. The support element according to claim 10, wherein said compatible material of said surface insert comprises a polyurethane based material, a film or layer of thermoplastic polyurethane material or a material impregnated with polyurethane, or any material pre-emptively treated with a compatibilizer material, including a primer suitable for sticking to said layer made from elastomeric material.

13. The support element according to claim 1, wherein said soft and yielding material of said layer is of the polyurethane foam type and/or an elastomeric material, optionally coated with a protective surface film applied by spraying or painting or by another suitable technique.

14. The support element according to claim 1, comprising at least one outer cover substantially at said at least one surface insert.

* * * * *